(12) United States Patent
Yeon et al.

(10) Patent No.: US 6,873,592 B2
(45) Date of Patent: Mar. 29, 2005

(54) SLIM OPTICAL PICKUP APPARATUS

(75) Inventors: Cheol-sung Yeon, Gyeonggi-do (KR); Pyong-yong Seong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 10/188,860

(22) Filed: Jul. 5, 2002

(65) Prior Publication Data

US 2003/0012116 A1 Jan. 16, 2003

(30) Foreign Application Priority Data

Jul. 10, 2001 (KR) ........................................ 2001-41211

(51) Int. Cl.[7] .................................................. G11B 7/00
(52) U.S. Cl. .............................. 369/112.28; 369/112.01; 369/44.23
(58) Field of Search ........................... 369/44.11, 44.12, 369/44.14, 44.23, 44.24, 44.27, 112.01, 112.09, 112.1, 112.14, 112.21, 112.27, 112.28

(56) References Cited

U.S. PATENT DOCUMENTS 5,151,890 A * 9/1992 Yonekubo ................. 369/44.11
5,313,447 A * 5/1994 Takeshita et al. ........ 369/112.29

FOREIGN PATENT DOCUMENTS

| JP | 60-36601 | 3/1985 |
|---|---|---|
| JP | 4-13243 | 1/1992 |
| JP | 4-205732 | 7/1992 |
| JP | 5-28531 | 2/1993 |
| JP | 6-267107 | 9/1994 |
| JP | 6-349101 | 12/1994 |
| JP | 7-161047 | 6/1995 |
| JP | 8-31000 | 2/1996 |
| JP | 11-134700 | * 5/1999 |
| KR | 1996-2205 | 1/1996 |
| KR | 1998-4432 | 3/1998 |

* cited by examiner

*Primary Examiner*—Muhammad Edun
(74) *Attorney, Agent, or Firm*—Staas & Halsey LLP

(57) ABSTRACT

A slim optical pickup apparatus which records/reads information from a recording medium includes a light source, an objective lens which focuses a beam incident from the light source on the recording medium, an optical device which is provided on an optical path between the light source and the objective lens, and converts the beam incident from the light source into a parallel beam, an optical axis shifting unit which is provided on an optical path between the optical device and the objective lens, and shifts an optical axis of the parallel beam passing through the optical device in parallel in a direction, a reflecting mirror which is provided on an optical path between the optical axis shifting unit and the objective lens, and reflects the parallel beam passing through the optical axis shifting unit toward the recording medium, and a photodetector which receives a beam reflected from the recording medium and passed through the optical axis shifting unit, and performs a photoelectric conversion. Use of the optical path shifting unit reduces the height of an optical pickup apparatus, thereby providing a slim optical pickup apparatus using an existing light source and photodetector of a conventional size.

26 Claims, 5 Drawing Sheets

SLIM OPTICAL PICKUP APPARATUS

CROSS-REFERENCE TO RELATED APPLICATIONS

This application claims the benefit of Korean Patent Application No. 2001-41211 filed on Jul. 10, 2001, in the Korean Industrial Property Office, the disclosure of which is incorporated herein by reference.

BACKGROUND OF THE INVENTION

1. Field of the Invention

The present invention relates to an optical pickup apparatus, and more particularly, to a compact slim optical pickup apparatus which can adopt an existing laser diode and photo diode having a conventional size.

2. Description of the Related Art

Optical pickup apparatuses radiate light at optical discs to record information or generate electrical signals from light reflected from the optical discs to reproduce information. They are used in apparatuses such as audio or video optical disc players. Optical pickup apparatuses occupy relatively wide space within the apparatuses adopting them. Accordingly, to use the optical pickup apparatuses for light compact apparatuses such as portable or car, audio or video, optical disc players, it is necessary to decrease the volume and thickness of the optical pickup apparatuses.

Generally, the size of an optical pickup apparatus is determined according to the thickness and working distance of an objective lens, which determine an optical efficiency of recording information on and/or reproducing information from an optical disc. To realize a compact slim optical pickup apparatus, it is necessary to reduce the size of the objective lens and other optical parts used in the optical pickup apparatus. Accordingly, it is necessary to reduce the size of a light source and photodetector. However, there is a limitation in reducing the size of the light source and photodetector.

A light source needs a heat sink such as a radiator plate which cools heat generated from the light source. Such a heat sink is provided around the light source and makes it difficult to reduce the size of a light source part, which includes the light source and the heat sink, below a certain size.

To reduce the size of a photodetector, extra manufacturing cost is required, thereby increasing the price of the photodetector.

Recently, a light source and a photodetector have been combined into a single optical module. Since a light source having high optical power is required with development of high-speed and high-density optical pickup apparatuses, it is more difficult to reduce the size of the optical module.

To solve the above problems, for example, Korean Patent Publication No. 98-4432 proposed a slim optical pickup apparatus whose size is reduced by providing a refractor on an optical path to refract a horizontal beam downward in a light emission unit.

FIG. 1 shows the conventional slim optical pickup apparatus disclosed in the Korean Patent Publication No. 98-4432. The apparatus includes a light source 11 which emits a horizontal beam, a refractor 13 which refracts the beam incident from the light source 11 downward, a mirror 15 which reflects the beam incident from the refractor 13 upward, a focusing unit 17 which focuses the reflected beam on a recording surface of a recording medium 19, and a photodetector (not shown) which receives a beam reflected from the recording surface of the recording medium 19 through the optical path.

However, the above mentioned conventional slim optical pickup apparatus uses a hologram as the refractor 13. Accordingly, an optical efficiency may decrease. Moreover, since a beam is incident on the mirror 15 on a slant, the beam may be blocked by the focusing unit 17, that is, a holder supporting an objective lens. Reference numeral 12 denotes holders of the focusing unit 17, and reference numeral 18 denotes a base for the light source 11.

To overcome the above problems, for example, Korean Patent Publication No. 96-2205 proposed another slim optical pickup apparatus using beam shaping prisms 3a and 3b which are designed such that the diameter of an incident beam on an entrance surface is reduced and shaped, and an outgoing beam forms an angle of 45° with an outgoing surface and is perpendicular to the incident beam, as shown in FIG. 2.

FIG. 2 shows that the above slim optical pickup apparatus includes the beam shaping prisms 3a and 3b for an optical disc recording apparatus, a light source 1, a collimating lens 2, a mirror 5, an objective lens 6, a recording medium 7, an aberration compensating lens 8, a beam splitter 9, photodetectors 10 and a base 28 for the light source 1.

The beam shaping prisms 3a and 3b change the non-uniform distribution of intensities of incident beams in a vertical or horizontal direction to shape the incident beams into a particular shape (a circular shape), and make outgoing beams perpendicular to the axis of an initial incident beam, thereby realizing the vertical or horizontal structure of an optical pickup apparatus for an optical disc.

Accordingly, use of a pair of beam shaping prisms makes it possible to manufacture a compact optical pickup apparatus having a uniform light intensity distribution. However, the pair of beam shaping prisms may cause chromatic aberration depending on the temperature. Moreover, strict tolerance is required to assemble the beam shaping prisms.

SUMMARY OF THE INVENTION

Accordingly, it is an object of the present invention to provide a slim optical pickup apparatus which can adopt an existing light source and photodetector having a conventional size.

Additional objects and advantages of the invention will be set forth in part in the description which follows and, in part, will be obvious from the description, or may be learned by practice of the invention.

To achieve the above and other objects of the invention, there is provided a slim optical pickup apparatus which records/reads information from a recording medium, comprising a light source which emits a beam, an objective lens which focuses the beam incident from the light source on the recording medium, a first optical device which is provided on an optical path between the light source and the objective lens, and converts the beam incident from the light source into a parallel beam, an optical axis shifting unit which is provided on an optical path between the first optical device and the objective lens, and shifts an optical axis of the parallel beam passing through the first optical device in parallel in a direction, a second optical device which is provided on an optical path between the optical axis shifting unit and the objective lens, and reflects the parallel beam passing through the optical axis shifting unit toward the recording medium, and a photodetector which receives a return beam reflected from the recording medium and passed through the optical axis shifting unit, and performs a photoelectric conversion.

According to an aspect of the present invention, the slim optical pickup apparatus further comprises an optical path converting unit which is provided between the first optical device and the optical axis shifting unit, and converts a path of the light beam reflected from the recording medium.

The optical path converting unit includes a beam splitter. The second optical device is a reflecting mirror.

To achieve the above and other objects, there is also provided a slim optical pickup apparatus which records/ reads information from a recording medium, comprising first and second light sources which emit first and second beams, respectively, having different wavelengths, an objective lens which focuses the first and second beams incident from the respective first and second light sources on the recording medium, a first optical device which is provided on an optical path between the first light source and the objective lens, and converts the first beam incident from the first light source into a first parallel beam, a second optical device which is provided on an optical path between the second light source and the objective lens, and converts the second beam incident from the second light source into a second parallel beam, an optical axis shifting unit which is provided on an optical path between the first and second optical devices and the objective lens, and shifts optical axes of the first and second parallel beams passing through the respective first and second optical devices in parallel in a direction, a third optical device which is provided on an optical path between the optical axis shifting unit and the objective lens, and reflects the first and second parallel beams passing through the optical axis shifting unit toward the recording medium, an optical path converting unit which is provided on an optical path between the first and second optical devices and the optical axis shifting unit, and converts corresponding paths of the first and second beams reflected from the recording medium, and a photodetector which receives a return beam reflected from the recording medium and passed through the optical axis shifting unit and performs a photoelectric conversion.

According to a further aspect of the present invention, each of the light sources emits a beam which is substantially parallel to a plane surface of the recording medium.

The optical plate may have a shape of a parallelogram in which facing sides are parallel to each other. Each of the first and second optical devices may include a collimating lens or a hologram device which converts a beam incident from each of the light sources into a parallel beam. The third optical device is a reflecting mirror.

Here, "shifting," "shift(s)," or "shifted" means that the axis of an incident beam of the optical path shifting unit is parallel to the axis of an outgoing beam thereof, and there is a displacement between these optical axes only in a vertical direction.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
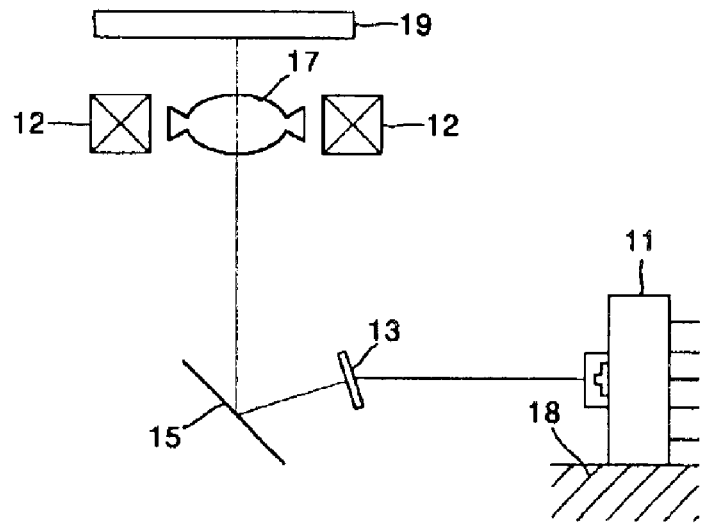
FIG. 1 is a schematic diagram of a conventional optical pickup apparatus.
Figure 2:
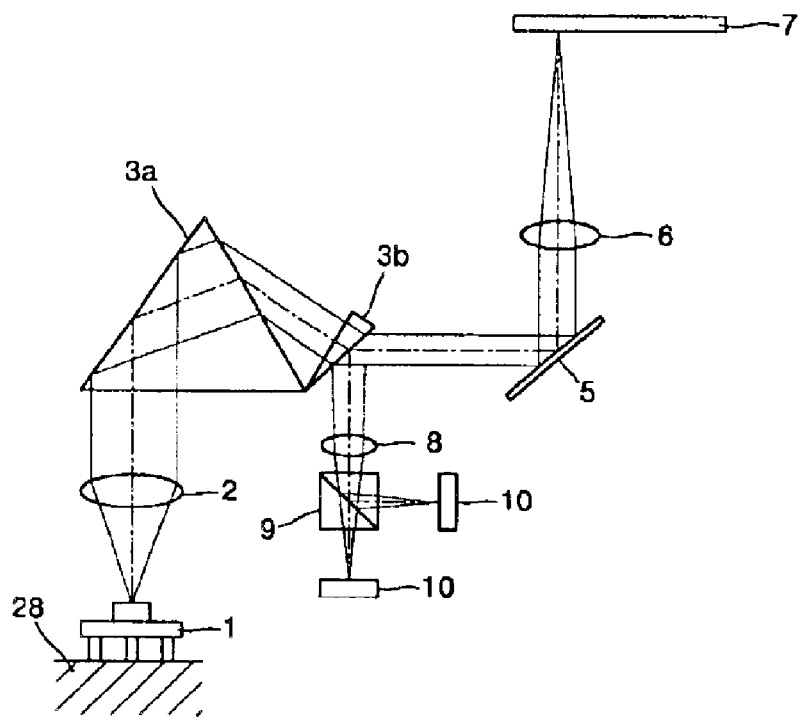
FIG. 2 is a schematic diagram of another conventional optical pickup apparatus.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3A:
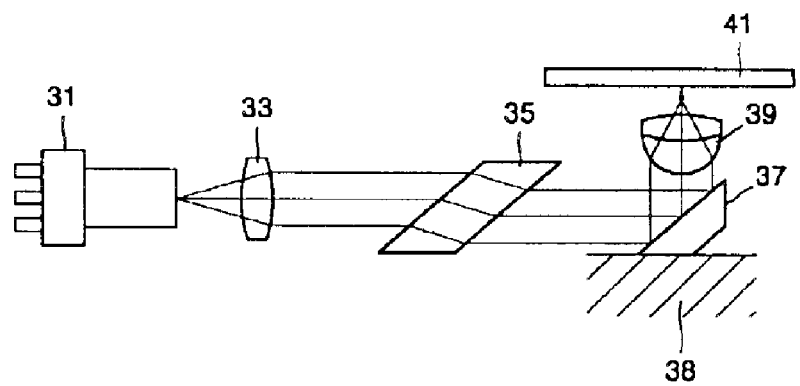
FIG. 3A is a sectional view of a slim optical pickup apparatus according to an embodiment of the present invention.
Figure 3B:
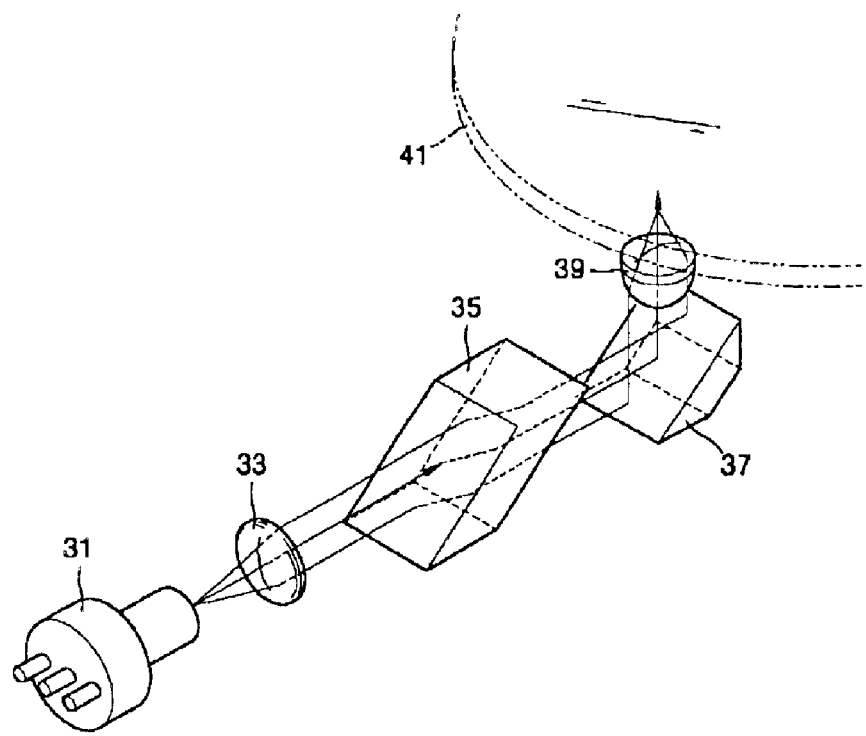
FIG. 3B is a perspective view of the slim optical pickup apparatus shown in FIG. 3A.

FIG. 3A shows a sectional view of a slim optical pickup apparatus according to an embodiment of the present invention. FIG. 3B shows a perspective view of the slim optical pickup apparatus.

Referring to FIGS. 3A and 3B, the slim optical pickup apparatus includes a hologram laser module 31 having an optical axis parallel to a plane surface of a recording medium 41 and an objective lens 39 which focuses a beam incident from the hologram laser module 31 on the recording medium 41.

A collimating lens 33 which converts the beam incident from the hologram laser module 31 into a parallel beam is provided on an optical path between the hologram laser module 31 and the objective lens 39. An optical plate 35 which shifts an axis of the parallel beam passing through the collimating lens 33 in parallel is provided on the optical path between the hologram laser module 31 and the objective lens 39.

A reflecting mirror 37 which reflects the parallel beam incident from the optical plate 35 toward the recording medium 41 is provided on the optical path between the hologram laser module 31 and the objective lens 39.

The hologram laser module 31 is provided with a laser diode (not shown) as a light source and a photodetector (not shown) which receives a beam reflected from the recording medium 41 and passed through the optical plate 35, and performs a photoelectric conversion.

The laser diode may be a compact disc (CD) laser diode which emits a beam having a wavelength of 780 nm to record data on or reproduce data from a CD, or a digital versatile disc (DVD) laser diode which emits a beam having a wavelength of 650 to record data on or reproduce data from a DVD. The light source may be provided with an edge emitting laser or a surface emitting laser.

The objective lens 39 may have a high numerical aperture of at least 0.6 and a short working distance so as to minimize the thickness of the optical pickup apparatus.

As described above, the optical plate 35 shifts the optical axis of the incident beam in parallel so as to have the optical axis be further away from the recording medium 41. The slope of the optical plate 35 is optimized so as to have the optical axis of the parallel beam incident from the collimating lens 33 shift in a direction perpendicular to a direction in which the parallel beam travels. Accordingly, the entire height of the optical pickup apparatus is minimized.

Since there is a limitation in reducing the size of an optical pickup apparatus including the hologram laser module 31 having a light source unit (including a heat sink) and a photodetector, the present invention provides a method of reducing the height from a base 38 of the optical pickup apparatus to the objective lens 39 using the space occupied by the hologram laser module 31.

In the optical pickup apparatus according to the above, the distance between the objective lens 39 and the reflecting mirror 37 is minimized to be as close as possible in terms of design. Accordingly, with the optical axis being shifted using the optical plate 35 described above, a slim optical pickup apparatus is provided in which the hologram laser module 31 is as close as possible, in a vertical axis, to the recording medium 41.

Figure 6:
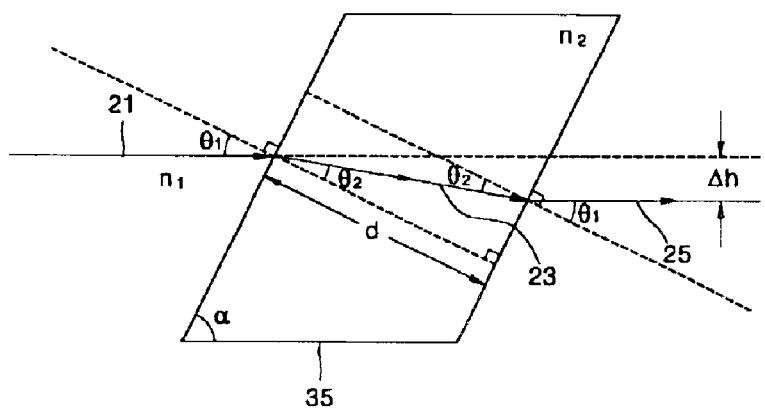
FIG. 6 is a diagram illustrating how an optical axis shifts in a slim optical pickup apparatus according to the present invention.

FIG. 6 shows a diagram illustrating how an optical axis shifts in the slim optical pickup apparatus shown in FIGS. 3A and 3B. Referring to FIG. 6, with reference to FIGS. 3A and 3B, an incident beam 21 passing through the collimating lens 33 is incident on the optical plate 35 at an angle of $\theta_1$ and is refracted at an angle of $\theta_2$ according to Snell's law, that is, Formula (1) below. A refracted beam 23 is refracted at an angle of $\theta_2$ according to the Formula (1) at the outgoing surface of the optical plate 35. An outgoing beam 25 has an optical axis shifted from the optical axis of the incident beam 21 by $\Delta h$. The distance $\Delta h$ by which the optical axis of the parallel beam passing through the optical plate 35 has shifted can be obtained from the Formula (1) and Formula (2):

$$n_1 * sin\theta_1 = n_2 * sin\theta_2 \quad (1)$$

$$\Delta h = d * sin(\theta_2 - \theta_1)/cos\theta_2 \quad (2)$$

In other words, a beam emitted from the hologram laser module 31 is converted into a parallel beam after passing through the collimating lens 33. Then, the optical axis of the parallel beam shifts vertically downward by $\Delta h$ after passing through the optical plate 35. The shift distance $\Delta h$ decreases the height from the base 38 of the optical pickup apparatus to the objective lens 39, thereby realizing a slim optical pickup apparatus. The parallel beam passing through the optical plate 35 is vertically reflected from the reflecting mirror 37 to the objective lens 39, passes through the objective lens 39, and is focused on the recording medium 41 to form an optical spot.

Figure 4A:
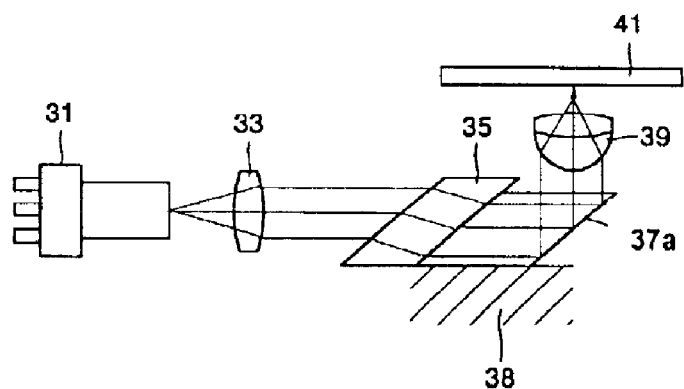
FIG. 4A is a sectional view of a slim optical pickup apparatus according to another embodiment of the present invention.
Figure 4B:
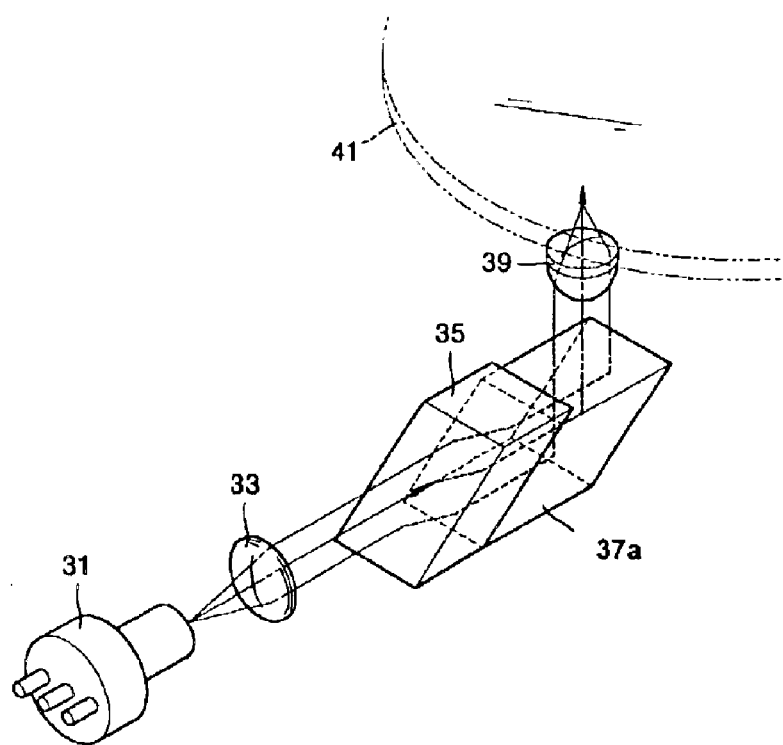
FIG. 4B is a perspective view of the slim optical pickup apparatus shown in FIG. 4A.

FIG. 4A shows a sectional view of a slim optical pickup apparatus according to another embodiment of the present invention. FIG. 4B shows a perspective view of the slim optical pickup apparatus shown in FIG. 4A.

Referring to FIGS. 4A and 4B, the slim optical pickup apparatus includes the same elements as the slim optical pickup apparatus shown in FIGS. 3A and 3B. However, unlike the embodiment shown in FIGS. 3A and 3B, an optical plate 35 of this embodiment contacts a reflecting mirror 37a.

A hologram laser module 31, a collimating lens 33, and an objective lens 39 provided in the FIGS. 4A and 4B are the same as those provided in the FIGS. 3A and 3B.

A beam, which is emitted from the hologram laser module 31 and converted by the collimating lens 33 so as to have its optical axis be parallel to a plane surface of a recording medium 41, is incident on a prism structure in which the optical plate 35 and the reflecting mirror 37a contact each other and are integrated. As described above, the optical axis of the beam incident on the optical plate 35 shifts in parallel by $\Delta h$ after passing through the optical plate 35, and the beam having the shifted optical axis is reflected from the rear of the reflecting mirror 37a and travels toward the objective lens 39.

In the optical pickup apparatus shown in FIGS. 4A and 3B, a height from a base 38 of the optical pickup apparatus to the objective lens 39 and a width between the hologram laser module 31 and the reflecting mirror 37 can be reduced, thereby realizing a structure which is more compact and slim than the conventional optical pickup apparatus.

Figure 5:
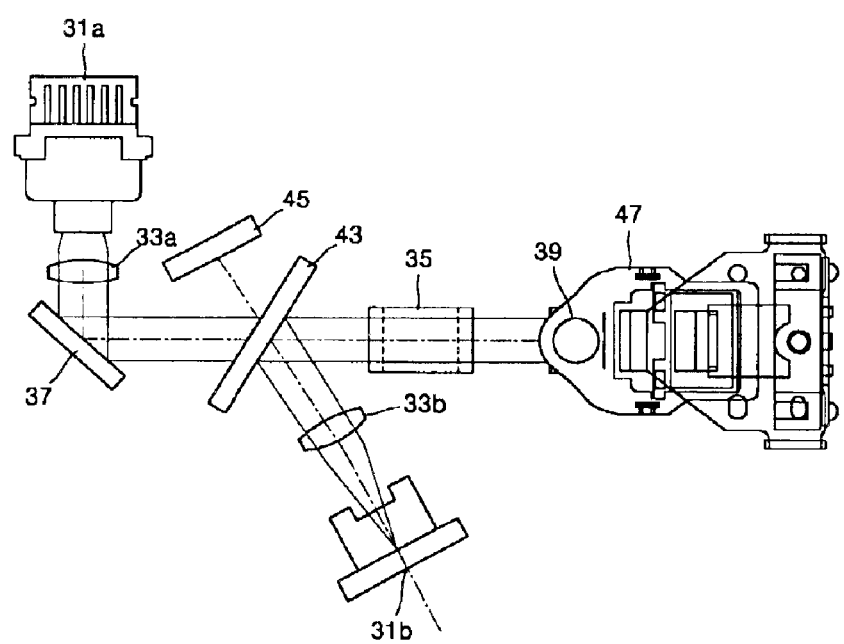
FIG. 5 is a plan view of a slim optical pickup apparatus according to yet another embodiment of the present invention.

FIG. 5 shows a plan view of a slim optical pickup apparatus according to yet another embodiment of the present invention. Referring to FIG. 5, the slim optical pickup apparatus includes a digital versatile disc (DVD) hologram laser module 31a which emits a laser beam (hereinafter, referred to as a first beam) for a DVD in parallel to a plane surface of a recording medium (not shown), a compact disc (CD) hologram laser module 31b which emits a laser beam (hereinafter, referred to as a second beam) for a CD, an actuator 47 having an objective lens 39 which focuses the first and second beams incident from the hologram laser modules 31a and 31b on the recording medium, a collimating lens 33a which is provided on an optical path between the DVD hologram laser module 31a and the actuator 47 and converts the first beam incident from the DVD hologram laser module 31a, and a collimating lens 33b which is provided on an optical path between the CD hologram laser module 31b and the actuator 47 and converts the second beam incident from the CD hologram laser module 31b.

An optical plate 35 which shifts optical axes of the first and second beams, which are incident from the respective collimating lenses 33a and 33b in parallel, in one direction in parallel is provided on an optical path between the collimating lenses 33a and 33b and the actuator 47. A mirror (not shown) which reflects the first and second beams passing through the optical plate 35 toward the recording medium is provided between the optical plate 35 and the objective lens.

A beam splitter 43 which converts an optical path of a beam reflected from the recording medium and passed through the optical plate 35 is further provided on the optical path between the DVD and CD hologram laser modules 31a and 31b, and the optical plate 35. A reflecting mirror 37 which reflects a parallel beam incident from the collimating lens 33a to change its optical path is further provided between the collimating lens 33a and the beam splitter 43. A monitor photodiode 45 which receives a beam reflected from the recording medium and passed through the optical plate 35, and performs a photoelectric conversion is further provided.

The DVD hologram laser module 31a includes a DVD laser diode (not shown), a DVD photodetector (not shown), and a hologram device (not shown) which diffracts beams reflected from the recording medium toward the DVD photodetector.

The CD hologram laser module 31b includes a CD laser diode (not shown), a CD photodetector (not shown), and a hologram device (not shown) which diffracts beams reflected from the recording medium toward the CD photodetector.

The actuator 47 includes a bobbin to install of the objective lens 39. Since the structure of the actuator 47 is widely known in the art, a detailed description thereof will be omitted.

The objective lens 39 and the optical plate 35 are the same as those of the slim optical pickup apparatus shown in FIGS. 3A and 3B. Thus, descriptions thereof will not be repeated.

The monitor photodiode 45 is a photodetector which receives a beam reflected from a recording medium, generates a signal through a photoelectric conversion, and determines whether information is accurately recorded on the recording medium based on the generated signal in an optical pickup apparatus which records information on the recording medium. Generally, an optical module such as a hologram laser module is provided with a light source and a photodetector, but the accuracy of the photodetector is not satisfactory to accurately record information on the recording medium. Accordingly, the present invention may provide a separate photodetector, the monitor photodiode 45 shown in FIG. 5, to an optical pickup apparatus for recording.

The optical plate 35 and the reflecting mirror 37 may contact each other to form an integrated structure within the slim optical pickup apparatus of this embodiment, as shown in FIGS. 4A and 4B. As described above, in a slim optical pickup apparatus employing such a structure, the height of the optical pickup apparatus and the width thereof can both be reduced. Accordingly, such a structure allows the manufacture of a slim optical pickup apparatus.

A slim optical pickup apparatus according to present invention may include a two-wavelength laser diode which can reproduce data recorded on a DVD and data recorded on a CD. The two-wavelength laser diode includes both a CD laser diode and a DVD laser diode.

A slim optical pickup apparatus according to present invention can be applied to recording media which an information signal is recorded on or reproduced from by way of a first surface recording (FSR) method. An FSR method is applied to recording media which do not have a conventional protective layer. In these recording media, a beam entrance surface is a recording surface, or only a protective coating of a several $\mu$m, for example, 5 $\mu$m, is formed on a recording surface formed on a substrate to protect the recording surface from dust or scratch. Accordingly, the working distance of an objective lens can be reduced by the thickness of a conventional protective layer (for example, a substrate having a thickness of 0.6 mm in the case of a DVD), thereby realizing a slim optical pickup apparatus.

A DVD laser beam emitted from the DVD hologram laser module 31a is converted into a parallel beam through the collimating lens 33a, is reflected from the reflecting mirror 37, and travels sequentially through the beam splitter 43 and the optical plate 35 to the actuator 47, at which the objective lens 39 is installed. The optical axis of the DVD laser beam shifts in one direction, that is, straight below (vertically toward the ground) in parallel through the optical plate 35.

A CD laser beam emitted from the CD hologram laser module 31b is converted into a parallel beam through the collimating lens 33b, is converted in its optical path through the beam splitter 43, and is incident on the optical plate 35. The optical axis of the CD laser beam shifts in one direction, that is, vertically downward (toward the ground) in parallel through the optical plate 35. After passing through the optical plate 35, the CD laser beam travels to the actuator 47, at which the objective lens 39 is installed.

The recording medium is provided above the actuator 47 facing the objective lens. A laser beam reflected from the recording medium travels back along the path it came and is incident on the photodetector. The optical axis of the laser beam shifts in a direction perpendicular to the traveling direction of the laser beam, that is, vertically upward, through the optical plate 35.

An optical pickup apparatus according to the present invention is provided with an optical plate and shifts the optical axis of a parallel beam incident from a light source in a direction perpendicular to a traveling direction of the parallel beam using the optical plate. Accordingly, the height from the base of the optical pickup apparatus to a recording medium is reduced. Therefore, the present invention can provide a compact slim optical pickup apparatus.

Although many particulars are specified in the above description, they are used in descriptive sense only and not for the purpose of limitation. For example, it is understood by those skilled in the art that where the optical axis of a beam emitted from a light source is not parallel to the plane surface of a recording medium, other optical device, for example, a wedge prism, with which an optical plate can be replaced, can be used to shift the optical axis, thereby reducing the height of an optical pickup apparatus without departing from the spirit of the present invention. Accordingly, the true scope of the invention will be limited by the above-described embodiments.

As described above, since the optical axis of a beam is shifted using an optical plate, the present invention can provide a compact slim optical pickup apparatus using an existing light source or photodetector of a conventional size, in which the position of the light source or photodetector is simply changed to reduce the height of the optical pickup apparatus.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A slim optical pickup apparatus which records/reads information from a recording medium, comprising:
    a light source which emits a beam;
    an objective lens which focuses the beam incident from the light source on the recording medium;
    a first optical device which is provided on an optical path between the light source and the objective lens, and converts the beam incident from the light source into a parallel beam;
    an optical axis shifting unit which is provided on an optical path between the first optical device and the objective lens, and shifts an optical axis of the parallel beam passing through the first optical device in parallel in a direction;
    a second optical device which is provided on an optical path between the optical axis shifting unit and the objective lens, and reflects the parallel beam passing through the optical axis shifting unit toward the recording medium; and
    a photodetector which receives a return beam reflected from the recording medium and passed through the optical axis shifting unit, and performs a photoelectric conversion, wherein the optical axis shifting unit is an optical plate.

2. The slim optical pickup apparatus of claim 1, wherein the light source emits the beam substantially parallel to a plane surface of the recording medium.

3. The slim optical pickup apparatus of claim 1, wherein the first optical device is one of a collimating lens and a hologram device.

4. The slim optical pickup apparatus of claim 1, further comprising an optical path converting unit which is provided between the first optical device and the optical axis shifting unit, and converts a path of the return beam reflected from the recording medium.

5. The slim optical pickup apparatus of claim 4, wherein the optical path converting unit is a beam splitter.

6. The slim optical pickup apparatus of claim 1, wherein the optical axis shifting unit contacts the second optical device.

7. The slim optical pickup apparatus of claim 1, wherein the second optical device is a reflecting mirror.

8. The slim optical pickup apparatus of claim 1, wherein the light source is one of a compact disc (CD) laser diode and a digital versatile disc (DVD) laser diode.

9. The slim optical pickup apparatus of claim 1, wherein the light source is one of an edge emitting laser and a surface emitting laser.

10. The slim optical pickup apparatus of claim 1, wherein the optical axis shifting unit reduces a height from a base of the slim optical pickup apparatus to the objective lens.

11. A slim optical pickup apparatus which records/reads information from a recording medium, comprising:

a light source which emits a beam substantially parallel to a plane surface of the recording medium;

an objective lens which focuses the beam incident from the light source on the recording medium;

a first optical device which is provided on an optical path between the light source and the objective lens, and converts the beam incident from the light source into a parallel beam;

an optical axis shifting unit which is provided on an optical path between the first optical device and the objective lens, and shifts an optical axis of the parallel beam passing through the first optical device in parallel direction;

a second optical device which is provided on an optical path between the optical axis shifting unit and the objective lens, and reflects the parallel beam passing through the optical axis shifting unit toward the recording medium; and a photodetector which receives a return beam reflected from the recording medium and passed through the optical axis shifting unit, and performs a photoelectric conversion, wherein the optical axis shifting unit is an optical plate and the optical plate has a shape of a parallelogram in which facing sides are parallel to each other.

12. A slim optical pickup apparatus which records/reads information from a recording medium, comprising:

first and second light sources which emit first and second beams, respectively, wherein the first and second beams have different wavelengths:

an objective lens which focuses the first and second beams incident from the respective first and second light sources on the recording medium;

a first optical device which is provided on an optical path between the first light source and the objective lens, and converts the first beam incident from the first light source into a first parallel beam;

a second optical device which is provided on an optical path between the second light source and the objective lens, and converts the second beam incident from the second light source into a second parallel beam;

an optical axis shifting unit which is provided on an optical path between the first and second optical devices and the objective lens, and shifts optical axes of the first and second parallel beams passing through the respective first and second optical devices in parallel in a direction;

a third optical device which is provided on an optical path between the optical axis shifting unit and the objective lens, and reflects the first and second parallel beams passing through the optical axis shifting unit toward the recording medium;

an optical path converting unit which is provided on an optical path between the first and second optical devices and the optical axis shifting unit, and converts corresponding paths of the first and second beams reflected from the recording medium; and a photodetector which receives a return beam reflected from the recording medium and passed through the optical axis shifting unit, and performs a photoelectric conversion.

13. The slim optical pickup apparatus of claim 12, wherein the first and second beams emitted from the corresponding first and second light sources are substantially parallel to a plane surface of the recording medium.

14. The slim optical pickup apparatus of claim 13, wherein the optical axis shifting unit is an optical plate.

15. The slim optical pickup apparatus of claim 14, wherein the optical plate has a shape of a parallelogram in which facing sides are parallel to each other.

16. The slim optical pickup apparatus of claim 12, wherein each of the first and second optical devices is one of a collimating lens and a hologram device.

17. The slim optical pickup apparatus of claim 12, wherein the optical axis shifting unit contacts the third optical device.

18. The slim optical pickup apparatus of claim 12, wherein the third optical device is a reflecting mirror.

19. The slim optical pickup apparatus of claim 12, wherein the optical path converting unit is a beam splitter.

20. The slim optical pickup apparatus of claim 12, wherein the first light source is one of a compact disc (CD) laser diode and a digital versatile disc (DVD) laser diode, and the second light source is the other of the CD laser diode and the DVD laser diode.

21. The slim optical pickup apparatus of claim 12, further comprising a second photodetector which receives the return beam, generates a signal thereof and determines whether the information is accurately recorded.

22. The slim optical pickup apparatus of claim 12, wherein the first and second parallel beams exiting from the optical shifting unit are in parallel and shifted in a perpendicular direction with respect to the first and second parallel beams entering the optical shifting unit.

23. A slim optical pickup apparatus which records/reads information from a recording medium, comprising:

a light source which emits a beam;

an objective lens which focuses the beam incident from the light source on the recording medium;

a first optical device which is provided on an optical path between the light source and the objective lens, and converts the beam incident from the light source into a parallel beam;

an optical axis shifting unit which is provided on an optical path between the first optical device and the objective lens, and shifts an optical axis of the parallel beam passing through the first optical device in parallel in a direction;

a second optical device which is provided on an optical path between the optical axis shifting unit and the objective lens, and reflects the parallel beam passing through the optical axis shifting unit toward the recording medium; and a photodetector which receives a return beam reflected from the recording medium and passed through the optical axis shifting unit, and performs a photoelectric conversion, wherein the objective lens has a numerical aperture of at least 0.6.

24. A slim optical pickup apparatus which records/reads information from a recording medium, comprising:

a light source which emits a beam;

an objective lens which focuses the beam incident from the light source on the recording medium;

a first optical device which is provided on an optical path between the light source and the objective lens, and converts the beam incident from the light source into a parallel beam;

an optical axis shifting unit which is provided on an optical path between the first optical device and the objective lens, and shifts an optical axis of the parallel beam passing through the first optical device in parallel in a direction;

a second optical device which is provided on an optical path between the optical axis shifting unit and the objective lens, and reflects the parallel beam passing through the optical axis shifting unit toward the recording medium; and a photodetector which receives a return beam reflected from the recording medium and passed through the optical axis shifting unit, and performs a photoelectric conversion, wherein the optical axis shifting unit reduces a height from a base of the slim optical pickup apparatus to the objective lens while incorporating the light source and the photodetector of existing sizes.

25. A slim optical pickup apparatus which records/reads information from a recording medium, comprising:

a light source which emits a beam;

an objective lens which focuses the beam incident from the light source on the recording medium;

a first optical device which is provided on an optical path between the light source and the objective lens, and converts the beam incident from the light source into a parallel beam;

an optical axis shifting unit which is provided on an optical path between the first optical device and the objective lens, and shifts an optical axis of the parallel beam passing through the first optical device in parallel in a direction;

a second optical device which is provided on an optical path between the optical axis shifting unit and the objective lens, and reflects the parallel beam passing through the optical axis shifting unit toward the recording medium; and a photodetector which receives a return beam reflected from the recording medium and passed through the optical axis shifting unit, and performs a photoelectric conversion, the optical axis shifting unit contacts the second optical device, wherein integration of the optical axis shifting unit and the second optical device reduces a height from a base of the slim optical pickup apparatus to the objective lens and a width between the light source and the second optical device.

26. A slim optical pickup apparatus which records/reads information from a recording medium, comprising:

a light source which emits a beam;

an objective lens which focuses the beam incident from the light source on the recording medium;

a first optical device which is provided on an optical path between the light source and the objective lens, and converts the beam incident from the light source into a parallel beam;

an optical axis shifting unit which is provided on an optical path between the first optical device and the objective lens, and shifts an optical axis of the parallel beam passing through the first optical device in parallel in a direction;

a second optical device which is provided on an optical path between the optical axis shifting unit and the objective lens, and reflects the parallel beam passing through the optical axis shifting unit toward the recording medium; and a photodetector which receives a return beam reflected from the recording medium and passed through the optical axis shifting unit, and performs a photoelectric conversion, wherein the parallel beam exiting from the optical shifting unit is in parallel and shifted in a perpendicular direction with respect to the parallel beam entering the optical shifting unit.

* * * * *